United States Patent [19]

Widman

[11] 4,048,969
[45] Sept. 20, 1977

[54] FUEL VAPORIZER APPARATUS

[76] Inventor: D. Edward Widman, Roberts Road, Sauquoit, N.Y. 13456

[21] Appl. No.: 699,576

[22] Filed: June 24, 1976

[51] Int. Cl.$^2$ .................... F02M 31/00; F02M 17/18
[52] U.S. Cl. ................................ 123/133; 123/122 E; 123/121; 123/179 H; 123/179 G
[58] Field of Search ................... 123/121, 133, 179 H, 123/179 G, 122 E

[56] References Cited

U.S. PATENT DOCUMENTS

| | | | |
|---|---|---|---|
| 2,746,440 | 5/1956 | Eriksen | 123/133 |
| 3,738,334 | 6/1973 | Farr | 123/122 E |
| 3,788,283 | 1/1974 | Perry | 123/133 |
| 3,888,223 | 6/1975 | Mondt | 123/133 |

Primary Examiner—Ronald H. Lazarus
Attorney, Agent, or Firm—Bruns & Jenney

[57] ABSTRACT

An internal combustion engine has the usual gasoline tank, electric starter, cam-operated fuel pump and inlet and exhaust manifolds. The exhaust manifold is converted to a heat exchanger by running steel tubing therethrough having an inlet connected to a second electrically operated pump and an outlet connected through electrically operated normally closed shutoff valve means to the intake conduit of a standard L.P. gas carburetor. The carburetor is connected to the inlet manifold by a base plate connected through an electrically operated shutoff valve to the cam-operated pump and provided with spray jet means for supplying liquid gasoline spray to the inlet manifold for starting. An electric switch having two "on" positions is provided, in the first position battery power is provided for starting and for opening the valve to the base plate and then for holding the valve open for about a minute at which time the switch is turned to its second position shutting off the valve to the base plate gas supply and turning on the electric pump and opening the valve means to the L.P. carburetor. A gasoline collecting reservoir between the L.P. valve means and the L.P. carburetor continuously returns any liquid gasoline to the electrically operated pump intake.

5 Claims, 8 Drawing Figures

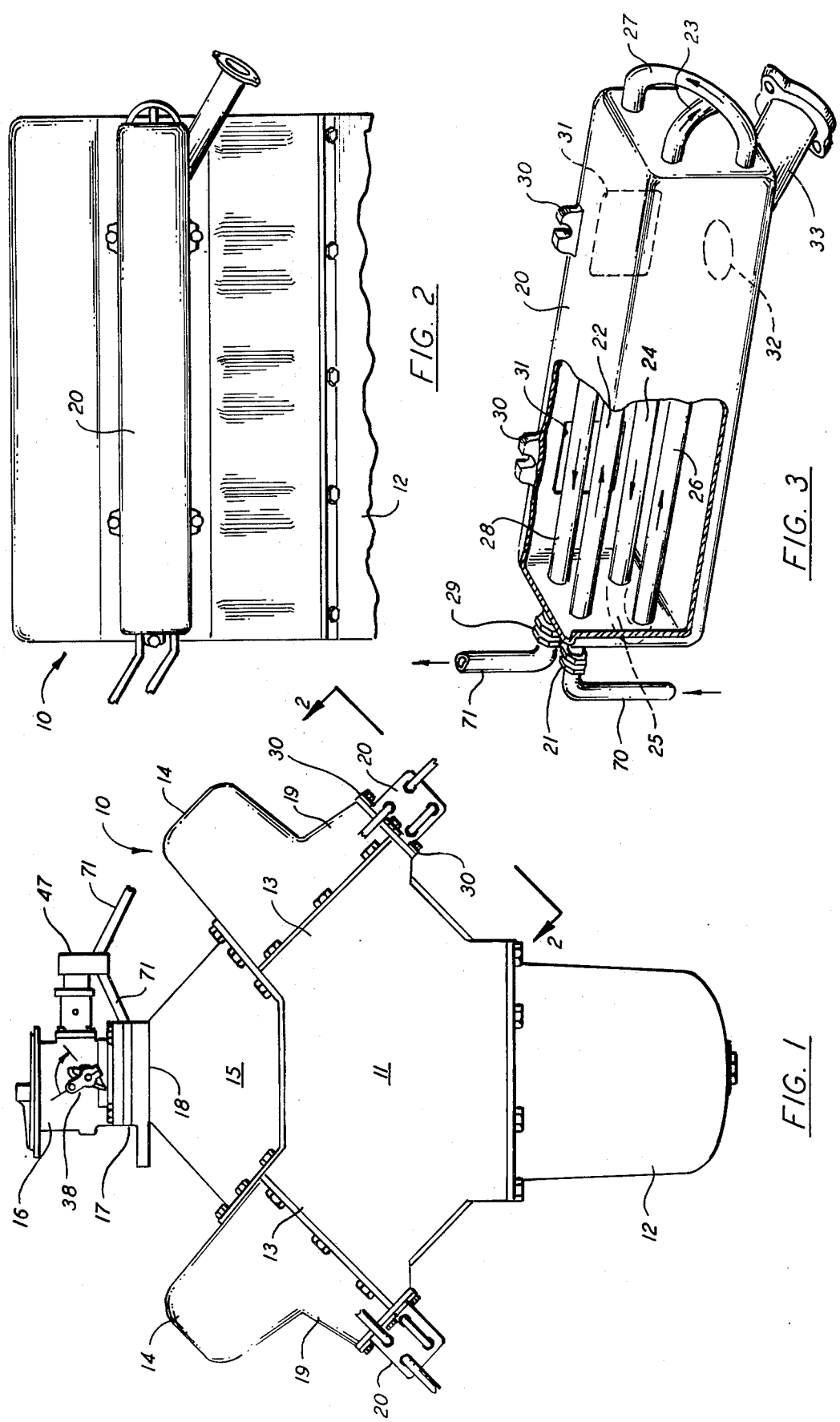

FUEL VAPORIZER APPARATUS

BACKGROUND OF THE INVENTION

This invention relates generally to carburetion systems for internal combustion engines and more particularly to such a system using heat exchanger means for supplying dry gas vapor to the engine through an L.P. gas carburetor, the carburetor being provided with auxiliary ordinary carburetor means for starting the engine.

Heretofore many types of heat-exchange means have been suggested for heating the liquid gas sprayed in the carburetor and supplied to the cylinders of the internal combustion engine but none of them has contemplated providing a carburetor for completely vaporized gas along with auxiliary means for starting the engine with liquid gasoline to run the engine until the heat exchanger is sufficiently hot to completely vaporize the gasoline.

SUMMARY OF THE INVENTION

It is contemplated that the internal combustion engine be supplied with a known L.P. gas carburetor along with a heat exchanger housed in the exhaust manifold of the engine, the carburetor being provided with a simple base plate having jet means therein for starting the engine on ordinary liquid gasoline fuel. The apparatus provided by applicant provides switch means coordinated with the usual automobile ignition and starter switch to operate the base plate carburetor for a sufficient time, typically of the order of one minute, and then, by manually moving the switch to a second position, to turn off the supply of liquid gasoline to the base plate carburetor and, at the same time, turn on a supply of completely vaporized fuel to the L.P. gas carburetor.

The system apparatus is simple to fabricate and hence can be economically provided as original equipment by the manufacturer or as modification equipment for engines in use presently. Presently obtainable steel tubing, plastic gasoline lines, valves and fittings, the auxiliary pump being electrically powered, and a presently obtainable L.P. gas carburetor are used. The carburetor base plate is easily fabricated and a two position switch as described hereinafter may be used or two switches mechanically connected to be mutually alternatively operated may be furnished.

BRIEF DESCRIPTION OF THE DRAWINGS

FIG. 1 is a front elevational view of a standard V-8 engine with apparatus according to the invention applied thereto;

FIG. 2 is a fragmentary side elevational view of the engine as viewed in the direction of arrows 2—2 of FIG. 1;

FIG. 3 is a perspective fragmentary view of one of the heat-exchanger exhaust manifolds as viewed from above and the side shown in FIG. 2, a portion of the manifold being cut away for clarity;

DESCRIPTION OF THE PREFERRED EMBODIMENT

Figure 7:
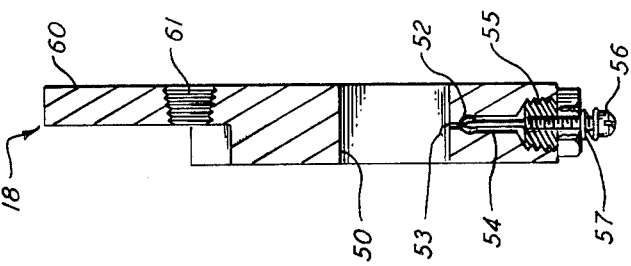
FIg. 7 is a sectional view on the line 7—7 of FIG. 6.

Referring to FIGS. 1-2, a V-8 engine 10 is shown having a cylinder containing block 11 and an oil sump member 12, it being understood that the crankshaft is centered in line with the center point of the junction line between block and sump. The four cylinders in line are indicated by the shade lines indicating the water jackets around the cylinders in FIG. 2, it being understood that the cylinders extend up the Y-arms 13 of block 11 substantially to the junction of the arms with the housings 14 for the valve mechanism.

An intake manifold 15 is shown between the valve housings 14. Not shown are the passages connecting carburetor 16 with the various cylinders. Carburetor 16 is a known L.P. gas carburetor bolted to the inlet manifold 15, the bolts extending down through a ⅛ inch thick, vapor-lock preventing gasket 17 and carburetor base plate 18 hereinafter described. Each valve housing 14 has an extension at 19 principally at two points housing exhaust gas passages to the exhaust manifold at 20.

Referring to FIG. 3 each manifold 20 is modified to form a heat exchanger by adding ⅜ inch diameter stainless steel seamless tubing starting with an entrance at 21 running to the back of the manifold through a tube 22 where it is connected by an integral diagonal crossover U-shaped tube portion 23 connecting with integral tube 24 which in turn is connected by welding a U-shaped crossover tube 25 at the front of the manifold and similarly connected to tube 26. The latter tube is connected at the back of the manifold by another integral diagonal-crossover U-shaped tube portion 27 to integral tube 28 leading to the exit 29.

Manifold 20 is provided with a plurality of welded on brackets 30 for bolting it to the extension 19 and exhaust ports 31, each leading to the exhaust valves of two cylinders, are indicated in FIG. 3. It will be noted that tube 28 runs past and is nearest to each of the ports 31. A single exhaust port 32 leads through a pipe 33 which may be bolted to a pipe leading to the muffler, not shown.

Figure 4:
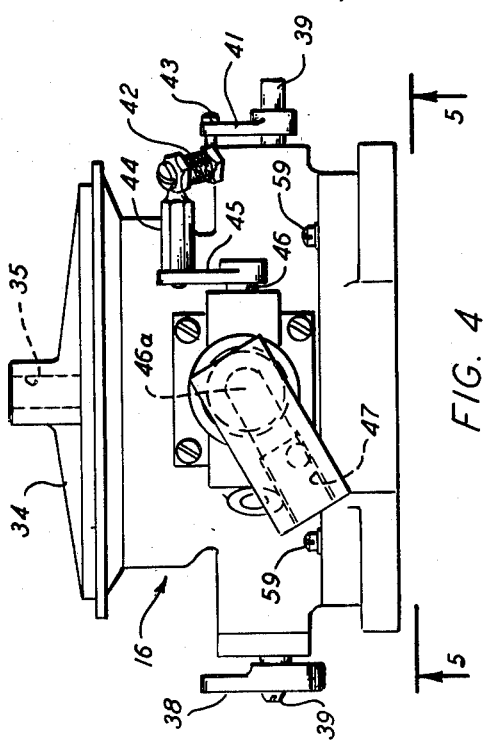
FIG. 4 is an enlarged side-elevational view of the L.P. gas carburetor showing the side opposite to that shown in FIG. 1.
Figure 5:
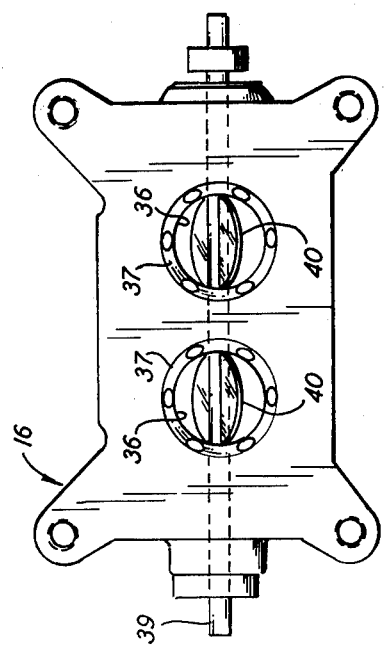
FIG. 5 is a bottom plan view of the carburetor of FIG. 4.

Referring now to FIGS. 4 and 5, the L.P. gas carburetor has a cover 34 provided with an air intake passage 35 adapted to be connected to a suitable air filter and has two bores 36 leading from the air intake to the gas dispersal rings 37. Hot, completely vaporized gasoline is supplied by apparatus to be described to the rings 37.

A lever 38, also shown in FIG. 1, is provided at the front of carburetor 16, adapted to be connected by suitable linkage to the accelerator pedal or other control for the engine 10 for turning a shaft 39 running from front to rear of the carburetor. Butterfly valves 40 in each of the bores 36 are carried by shaft 39.

As best seen in FIG. 4, the end of shaft 39 opposite lever 38 carries a lever 41 secured to the shaft. The outer end of lever 41 is secured to one end of a two part rod 42 by a screw 43. The other end of rod 42, whose length is adjustable, is secured to a pin 44 secured to the outer end of a lever 45 secured to the end of a shaft 46 which operates a metering valve, not shown but indicated at 46a, controlling the rate of admission of hot dry gas from the exhaust manifold-heat exchangers 20.

The dry gas admission passage 47, which leads to both dispersal rings 37 of the carburetor, may be connected by tubing and through valves, hereinafter described, to suitable fittings at the exit end of each tube 28 of the exchangers 20.

Figure 6:
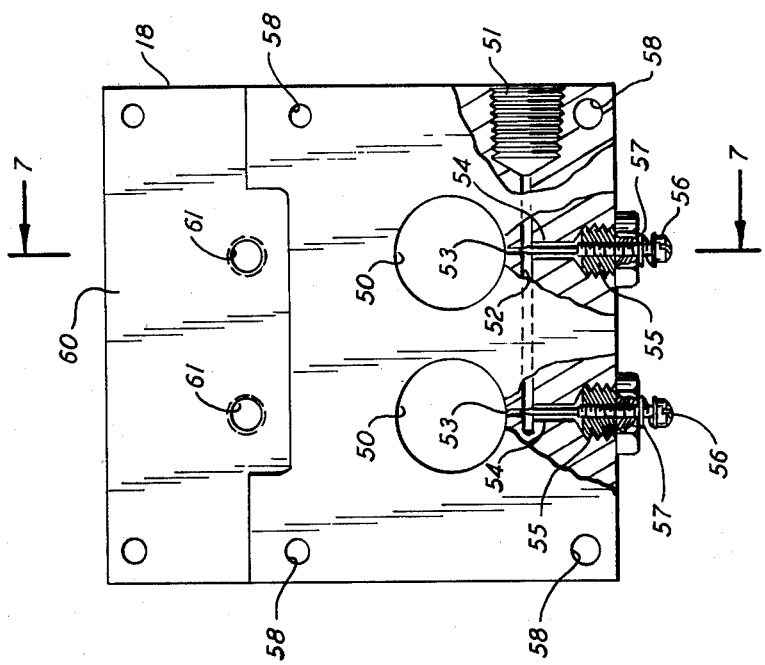
FIG. 6 is an enlarged plan view of the base plate shown in FIG. 1, portions being cut away for clarity.

Referring now to FIGS. 6 and 7, the carburetor base plate 18 comprises an auxiliary carburetor for starting engine 10 until the heat exchangers 20 are warmed up. The base plate is only one inch in thickness and is provided with two bores 50 axially aligned with the bores 36 of carburetor 16 and with a gasoline inlet 51 adapted to be connected by a suitable nipple and tubing to a supply of gasoline under pressure as hereinafter described. A passage 52, connected to inlet 51 is drilled in the plate 18 leading past and adjacent both bores 50, as shown in FIG. 6. A smaller passage 53 is drilled in the plate connecting passage 52 with each bore 50 and a larger passage 54 in prolongation of passages 53 are provided leading to the edge of the plate, as shown.

At the edge of the plate each passage 54 is enlarged and tapped for the reception of an annular threaded bushing 55 provided with a nut-like head, as shown. At the center of each bushing 55, the bushing threadedly receives a needle valve 56 having an enlarged screw-type head and each needle valve extends to a pointed end adapted to enter the passage 53. A coil spring 57 is provided between the head of the needle valve and the head of bushing 55 for retaining needle valve 56 in its adjusted position with its pointed end in passage 53, in the usual manner for regulating the flow of gasoline into the respective bore 50.

Four screw holes 58 are provided at the corners of the plate for the passage of screws 59 (FIG. 4) which pass downward from the lower portion of carburetor 16 through gasket 17 and plate 18 into threaded holes for their ends in intake manifold 15.

A half inch thick projection 60 may be provided at the bottom surface of plate 18 and two threaded holes 61 may be provided in this projection for connecting pvc. valves in the carburetor or elsewhere to spaces in the inlet manifold although this forms no part of the present invention.

Figure 8:
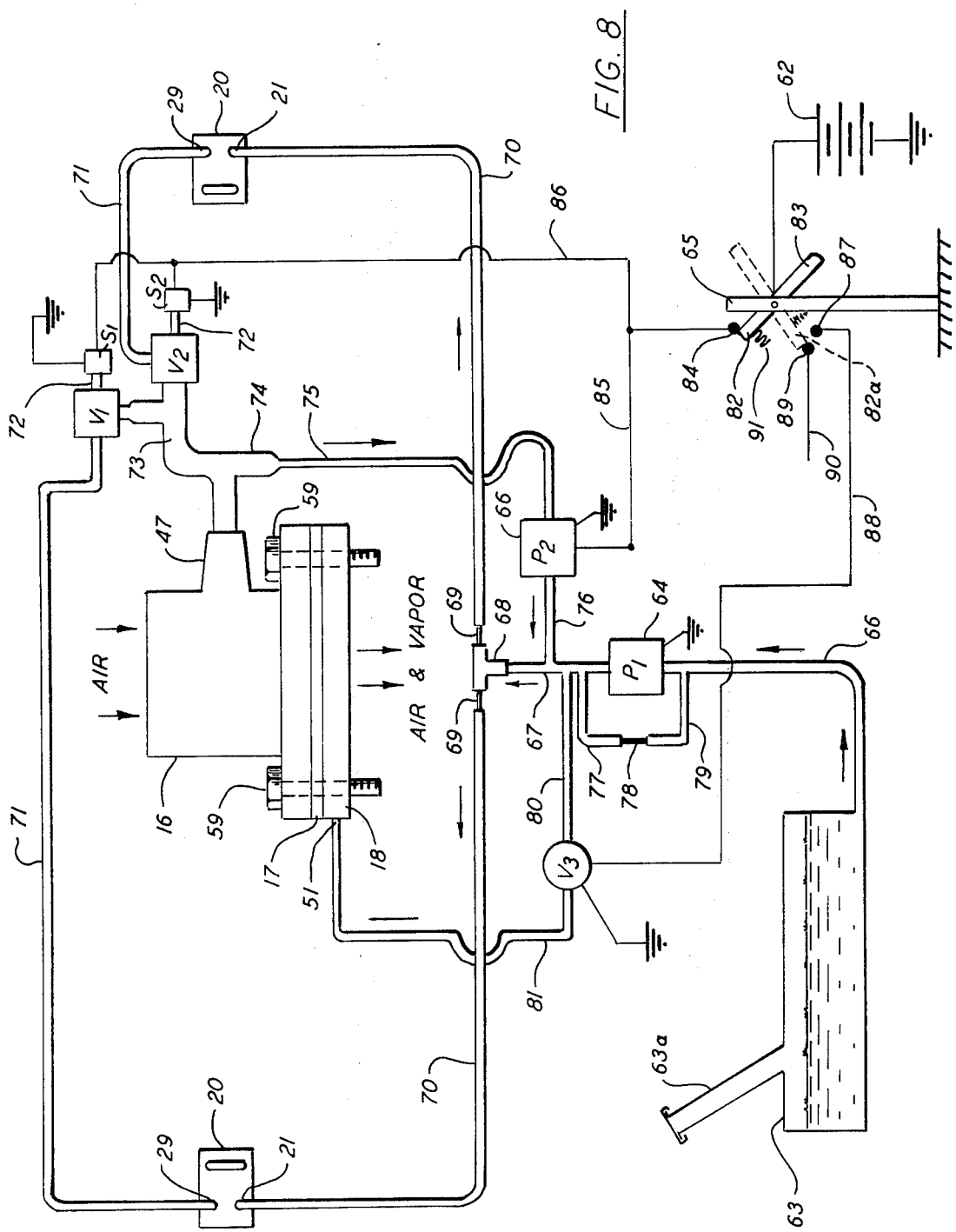
FIG. 8 is a diagrammatic view of the apparatus partially shown in FIG. 1.

Referring now to FIG. 8, apparata other than those previously described are shown diagrammatically. Besides the carburetor 16, base plate 18, and heat exchangers 20, a 15 v. battery 62, a gas tank 63, with the usual filler pipe 63a, and the usual cam operated fuel pump 64 provided with the engine 10, are shown diagrammatically. Also shown are a switch 65 and an auxiliary electrically powered pump 66.

The gas tank 62 has the usual 5/16 inch diameter fuel pipe 66 connecting it to the cam-operated pump 64 and a 5/16 inch diameter fuel delivery line 67 leading to the T68 each of whose transversely extending arms are provided with a metering passage 69 about 0.050 inch diameter, connecting the T to a fuel conduit 70 5/16 inch diameter leading to a fuel entrance 21 of a respective heat exchanger 20. The exit 29 of each heat exchanger is connected to a ⅜ inch diameter conduit 71 leading to a respective, normally closed, electrically operated valve $V_1$ or $V_2$. It will be noted that the solenoids $S_1$ and $S_2$ for operating valves $V_1$ and $V_2$ are separated from their respective valves by a rod 72 which is non-heat-conductive so that the solenoids are unaffected by the high heat of the gas vapor received from the lines 71.

Each valve $V_1$ and $V_2$ has its normally closed exit passage connected by suitable fittings, not shown, to a 3/4 inch diameter collector pipe 73 having its delivery end connected to the inlet passage 47 (FIG. 4) of the carburetor 16. Collector pipe 73 has formed therewith a sump 74, for collecting whatever condensation of gasoline may appear at this point. The sump is connected by a smaller fuel conduit 75 back to the intake of the electrically operated pump 66 which has its delivery end connected by a fuel conduit 76 leading back to line 67.

A bypass line 77 leads from the fuel line 67 through a metering passage 78 of 0.030 inch diameter, and through return line 79 connected to fuel line 66 below the pump 64. Another fuel line 80 connects fuel line 67 through another normally closed, electrically operated valve $V_3$ to a fuel line 81 leading to the gasoline inlet 51 of base-plate 18.

Switch 65 has a fixed portion extending vertically in FIG. 8 and a movable portion 82 pivotted on the fixed portion and having a handle 83. The movable portion 82 is connected at its pivot to the battery 62, as shown and has two alternative "on" positions. The first position is shown in full lines in FIG. 8 in which the switch contact 82 is in electrical contact with a contact 84. Contact 84 is connected by a wire 85 to the appropriate lead wire on the electrically operated pump 66 and by a wire 86 leading to both of the appropriate lead wires of the operating mechanisms $S_1$ and $S_2$ for opening valves $V_1$ and $V_2$. Each mechanism, pump 66 and solenoids $S_1$ and $S_2$, is appropriately grounded, as shown, for operation of the mechanism shown.

Switch 65 has a second position 82a shown in broken lines in which the contact 82 is in electrical contact with another contact 87. Contact 87 is electrically connected by a wire 88 to the appropriate lead wire of another normally closed shutoff valve $V_3$, which is appropriately grounded, for closing valve $V_3$ which shuts off the flow of gasoline to plate 18 through fuel line 81.

Switch 65 also may have a third contact 89 connected by a wire 90 to the starter motor, not shown, of engine 10. Contact 82 carries a spring 91 which may be compressed so that the contact 82 may be first in electrical contact with contacts 87 and 89 and may be moved out of contact with contact 89 by the spring 91 when handle 83 is released. It will be understood that the movable contact 82 may be first moved to the position in which electrical contact is made with both contact 87 and 89 for starting engine 10. Then, when the engine starts, handle 83 is released and spring 91 moves the contact 82 away from contact 89 but still in electrical contact with contact 87. It will be understood that the electrical appliances and wiring hereinabove described are appropriate for use with the 12 volt battery 62.

In operation, switch 65 is first moved manually to the position shown at 82a with contact 82 in contact with both contact 87 and contact 89 for opening valve $V_3$ and energizing the self starter motor. When the engine 10 starts, handle 83 is released and contact 82 is moved back by spring 91, cutting off the starter motor but still is contact with the contact 87, as described above, for keeping valve $V_3$ open. Contact 84 is not energized so that pump 66 is not operated and valves $V_1$ and $V_2$ remain closed for preventing delivery of hot gasses from heat exchangers 20 to the carburetor inlet 47.

After a short interval of the order of one minute, the heat exchangers 20 have been heated by the exhaust gasses passing through the heat exchangers, and switch 65 may be manually moved to the position shown in full lines in FIG. 8. Valve $V_3$ is deenergized and returns to its normally closed position cutting off the flow of gasoline to base plate 18.

Contact 84 now is energized starting the pump 66 and energizing solenoids $S_1$ and $S_2$ to open valves $V_1$ and $V_2$ allowing the hot gasses from heat exchangers 20,20 to enter the carburetor at 47 and be distributed by the rings 37 to the bores 36 for passage to the intake manifold.

The operation of the heat exchangers is such that the gasoline passing through tubing 21-29 is heated to a point where the gasoline boils to a dry gas vapor which powers engine 10 using the vehicle's waste heat in the exhaust manifolds to do so, Gasoline has heavy and light molecules and the heavy molecules are changed by the heat exchangers to lighter molecules which all may be burned by the engine and preventing heavy molcules, which are ordinarily passed out through the exhaust pipe to atmosphere, to be so discharged.

While the engine is running, both pumps 64 and 66 force gasoline through the metering valves or passages 69 to both heat exchangers. The passage of the hot, vaporized gasses through the carburetor is controlled by the metering valve 46a of the L.P. gas carburetor of the type which is known and used on warehouse vehicles, for instance.

When the switch 65 is turned to its "off" position, with its movable contact 82 out of contact with either contact 84 or 87, the liquid fuel which has just been pumped into the tubing of the heat exchangers 20 starts to boil, valves $V_1$ and $V_2$ now being closed, and back pressure is now apparent in fuel lines 70—70 back toward pump 64. This pressure is relieved by lines 77 and 79 and through the metering valve or passage 78 allowing the now condensed gasoline to flow back toward tank 63.

Although the engine 10 described is a V-8 and carburetor 16 is shown as a double barrel L.P. gas carburetor, it will be apparent that the apparatus shown may include an internal combustion engine of any type having a chamber-like exhaust manifold which may be converted to a heat exchanger by adding steel tubing for heating the incoming gasoline and the L.P. gas carburetor may be a single bore carburetor where appropriate or two single carburetors may be used where appropriate if the accompanying apparatus is also appropriately modified.

Applicant has conducted tests with a 1968 American Motors Rambler Ambassador automobile, weight 4100 lbs, and having 111,392 miles of use. The 343 C.I.D. V-8 engine of the test car was modified as described hereinabove and tested on the road. Prior to modification the test car was averaging between 9 and 11 miles per gallon. After modification the test car averaged between 26.5 and 27.1 miles per gallon. Exhaust fumes seemed less noxious than before although no measurement of the fumes was made.

The test car was designed for use with 98 octane gasoline. During the test 80 octane unleaded gasoline was used and no engine knock was observed. Prior to modification, the best mileage the test car ever obtained was about 16.7 miles per gallon when new.

I claim:

1. An internal combustion engine having intake and exhaust manifolds, a gasoline tank, ignition means including an ignition switch and a battery, an L.P. gas carburetor, the L.P. gas carburetor having an air intake and being mounted on a base plate having a carburetor bore connecting the L.P. gas carburetor discharge passage with the engine intake manifold, the base plate having jet means for spraying gasoline into the bore, the engine having heat exchanger means associated with its exhaust manifold for heating gasoline passing to the carburetor to a high temperature for breaking down the gasoline to a hot vapor in which heavy molecules are broken down into lighter molecules, the engine having a cam driven fuel pump for supplying gasoline to a delivery conduit to two passages, the first passage supplying gasoline to the base plate carburetor bore through first normally closed electrically-operated shutoff valve means, the second passage supplying fuel to the carburetor through the heat exchanger and through second normally closed electrically-operated shutoff valve means, the conduit from the heat exchanger to the carburetor being the hot gas conduit and having a sump adjacent its entrance to the caburetor for collecting gasoline condensed during its passage through the hot gas conduit, the sump being connected by a drain conduit to the intake of an auxiliary electrically operated pump whose delivery outlet is connected by a return conduit to the delivery conduit, the delivery conduit is connected to a by-pass conduit having a metering passage for the slow return of gasoline boiled in the hot gas conduit to the gasoline supply tank for the engine when the engine is turned off, switch means associated with the ignition switch of the engine has two alternative positions in which the movable contact of the switch is first in contact with a first fixed contact for supplying electric current from the engine battery to the first normally closed electrically operated shutoff valve means, and a second fixed contact for supplying electric current to the second shutoff valve means and to the auxiliary pump, whereby the engine is started and the movable contact is held in contact with the first fixed contact for shutting off the flow of fuel through the heat exchanger means and the hot gas conduit to the carburetor for about one minute, and then when the heat exchanger means is warmed, the movable contact is moved to contact with the second fixed contact for shutting off the flow of fuel to the base plate and starting flow of fuel through the hot gas conduit and starting the auxiliary pump.

2. In an internal combustion engine having accelerator mechanism, a gasoline tank, a cam-operated fuel pump whose inlet is connected by a fuel conduit from the tank and having a delivery conduit to the engine, inlet and exhaust manifolds and battery means for the engine ignition mechanism, the improvement comprising a system including an L.P. gas carburetor having coacting valve means linked to the accelerator mechanism for controlling the quantity of air and the quantity of fuel vapor admitted through a hot gas inlet to the carburetor, and including heat exchanger means heated by exhaust gasses in the exhaust manifold for heating gasoline in steel tubing as it passes to the carburetor, the caburetor being secured on a base plate secured to the inlet manifold and having its fuel vapor and air mixture outlet connected to an inlet of the intake manifold, the base plate being provided with a gasoline inlet connected to regulatable jet spray means for spraying gasoline into an air stream passing into the inlet manifold for starting the engine, the system also including: a first branch gasoline conduit for carrying gasoline from the delivery conduit to the base plate inlet, a normally closed and electrically controlled shutoff valve being included in the branch gasoline conduit, second branch gasoline conduit means for carrying gasoline from the delivery conduit to the steel tubing intake in the heat exchanger means, the steel tubing exit in the heat exchanger means being connected by hot vapor conduit means through normally closed electrically controlled shutoff valve means to a hot gas collector pipe leading to the carburetor hot gas inlet, the latter normally closed electrically controlled shutoff valve means having its electrically controlled motor means heat-insulated from the valve means, the hot gas collector pipe having a sump for collecting liquid gasoline condensed in the hot vapor conduit means, the sump being connected by a drain conduit to the intake of an auxiliary electrically-operated pump whose discharge outlet is connected to the delivery conduit, and a switch, the switch having at least two fixed contacts, and a movable contact alternatively in contact with the first and second fixed contacts, the first fixed contact being electrically connected to the shutoff valve of the first branch gasoline conduit for opening that valve, the second fixed contact being electrically connected to the shutoff valve means of the second branch gasoline conduit for opening the latter valve means and also electrically connected to the auxiliary pump for operating the latter pump; whereby, after the engine is started, the movable contact remaining in contact with the first fixed contact, the engine is supplied with fuel through the carburetor base plate for an interval of about one minute, and then the movable contact is moved into contact with the second fixed contact for supplying hot vaporized fuel to the engine from the heat-exchanger means.

3. The internal combustion engine defined in claim 2, having a bypass conduit including a metering passage connecting the delivery conduit on one side of the cam-operated pump to the fuel conduit from the tank on the other side of the cam-operated pump; whereby, when the engine is stopped, by moving the switch movable contact to a position out of contact with both the first and second fixed contacts, fuel remaining in the hot-vapor conduit means boils and forces fuel back through the heat exchanger and back through the drain conduit to the delivery conduit and condenses, flowing slowly through the bypass conduit to the fuel conduit to the tank.

4. The internal combustion engine defined in claim 3 having electric motor starting means and the switch having a third fixed contact adjacent the first fixed contact, the third contact being electrically connected to the electric motor starting means, and the switch having a spring means compressed between the movable contact and a fixed portion of the switch when the movable contact is first manually moved into contact with the first fixed contact and also in contact with the third fixed contact for starting, and when the movable contact is released the movable contact is moved out of contact with the third fixed contact by the spring and remains in contact with the first fixed contact for warming the engine.

5. The internal combustion engine defined in claim 4 wherein the engine is of the V-type and has two exhaust manifolds and two heat exchanger means, the L.P. gas carburetor and the base plate having two aligned bores each for mixing heated fuel vapor from both heat exchanger means and the collector pipe with air admitted to the carburetor, both bores being connected for discharging air and fuel vapor to the inlet manifold.

* * * * *